May 21, 1968   R. A. MASON   3,384,281
INTERMITTENT TAPE FEED
Filed Oct. 4, 1965
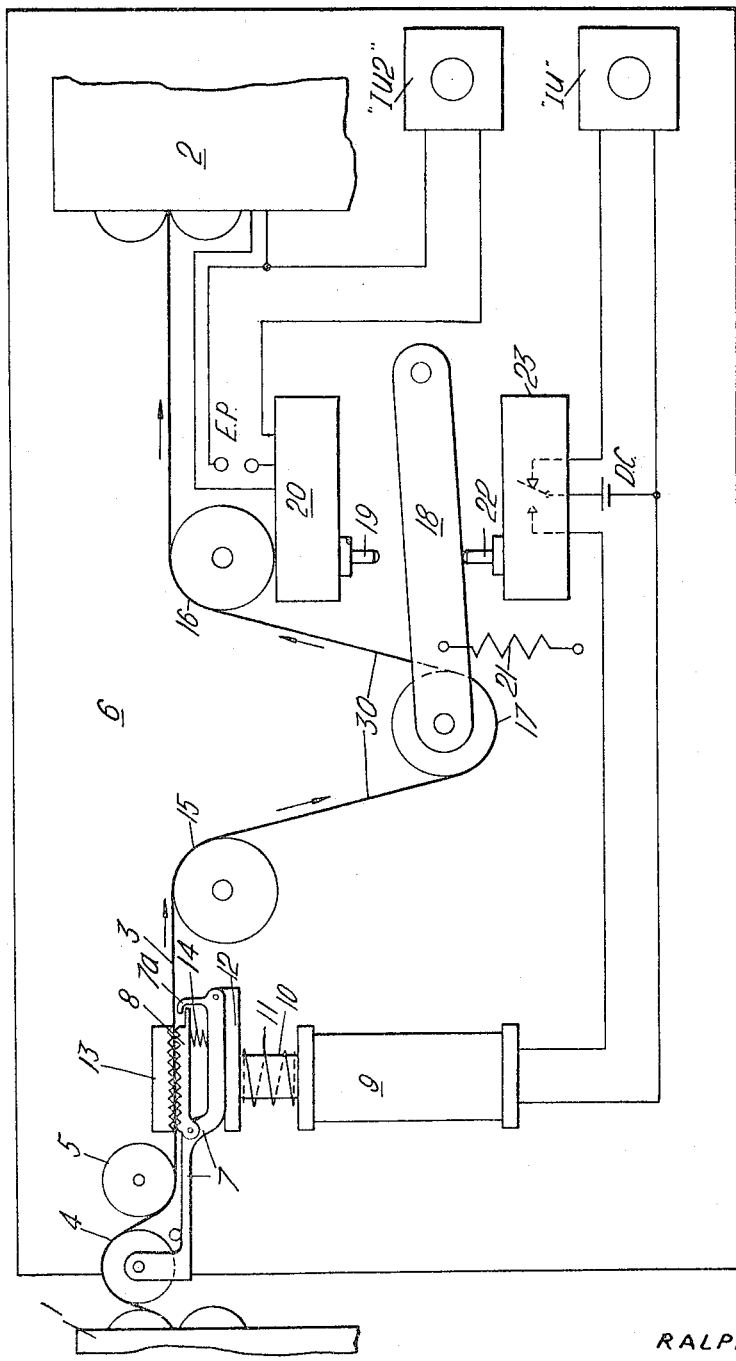
Inventor
RALPH A. MASON
By Percy P. Lantzy
Attorney United States Patent Office 3,384,281
Patented May 21, 1968

3,384,281
INTERMITTENT TAPE FEED
Ralph A. Mason, Brighton, England, assignor to Creed & Company Limited, Hollingbury, Brighton, England, a British company
Filed Oct. 4, 1965, Ser. No. 492,576
Claims priority, application Great Britain, Nov. 6, 1964, 45,305/64
6 Claims. (Cl. 226—25)

ABSTRACT OF THE DISCLOSURE

Apparatus for arresting and releasing the tape in the supply thereof to a loop, including an electro-magnetically operated brake, a number of loop forming rollers engaging the tape and one of which is operative to cause a sensing member to move in one or the other of two directions dependent on respectively an increase or decrease in the amount of tape in the loop, and electric switching means operative by the sensing member to generate pulses when and only when the tape is moving, and to act on the brake to alternately arrest and release the tape in the supply thereof to the member.

---

The invention relates to apparatus for indicating movement of a continuous length of material, for example tape of the data bearing variety, to a utilisation device.

According to a first aspect of the present invention there is provided apparatus for indicating movement of a continuous length of material withdrawn from a source of supply during normal working of other equipment into which the material is fed at a uniform rate, the apparatus including: means for forming, in between the said equipment and the said source, a loop in the length of material from one end of which loop the material is withdrawn at the said uniform rate during normal working; a brake for braking the movement of the material into the loop; sensing means for sensing the size of the loop; and means coupling the sensing means to the brake in such manner that, during withdrawal of the material at the said uniform rate, the sensing means alternates between respective positions determining application and release of the brake.

According to a second aspect of the invention there is provided apparatus for supplying tape at an alternating rate to a loop of tape as it is withdrawn therefrom at a substantially uniform rate, the apparatus including an electro-magnetic brake operative to arrest or release tape in the supply thereof to the loop; a plurality of loop-forming rollers on which the tape is arranged and one of which rollers is operative, through engagement of the tape therewith, to cause a sensing member to move in one or the other of two directions dependent respectively on an increase or decrease in the amount of tape in the loop; and electric switching means operative by the sensing member in alternating movements thereof in the one and the other direction to apply and inhibit application of an energising current to the electro-magnetic brake which thereupon alternately arrests and releases the tape.

The invention will be better understood from the following description read with reference to the accompanying drawing which shows one embodiment of apparatus according to the present invention.

In its passage between a source of supply i.e. a store 1, and other equipment such as a tape utilisation device 2, material in the form of tape 3, which may be of the data bearing variety, is passed through the apparatus now to be described.

This apparatus has for its purpose the functions of: (a) maintaining a supply of tape from the store to the utilisation device, by way of a loop of tape, in accordance with the requirements of the device whilst; (b) indicating movement of the tape in the loop between the store and the device; (c) indicating obstruction to movement of tape from the store and prevention of further withdrawal and; (d) indicating cessation of withdrawal of tape from the store by the device.

The apparatus comprises a pair of rollers 4 and 5 over and under which rollers, respectively, the tape is passed as it leaves the store 1. The roller 5 is rotatably mounted on a spindle which extends from an apparatus frame 6, and roller 4 is rotatably mounted on a spindle of a member 7 which is pivotally mounted on the head 12 of an electro-magnetic tape brake device. This brake further comprises a slugged coil 9, an armature 10, a compression spring 11 accommodated on the armature between its head 12 and the upper end of the coil. A first jaw 8 is pivotally mounted on member 7 and is urged away therefrom by a compression spring 14 therebetween to an extent limited either by a stop 7a or, as will be explained below, by a jaw 13 which is fixed to the apparatus frame 6 in a position which permits the tape to pass between both of the jaws. When jaw 8 is not abutting stop 7a the tape is gripped by both the jaws as shown. This particular condition of the jaws with respect to the tape obtains only when the coil 9 is in the de-energised condition, and the armature 10 is held in the upper one of two positions by the compression spring 11.

That portion of the tape 3 between the brake and the utilisation device 2 is arranged to pass over rollers 15 and 16 rotatably mounted on spindles extending from the apparatus frame 6 and under a roller 17 rotatably mounted therebetween on one end of a sensing member constituted by lever 18, so forming a tape loop 30. The lever 18 is pivotally mounted, at its other end, to the apparatus frame 6 and it is operative, under the action of the tape 3 in contact therewith, to engage the operating member 19 of a microswitch 20; or operative, under the action of a tension spring 21, to engage the operating member 22 of another microswitch 23. The microswitch 23 has a normally closed pair of contacts electrically connected in series with a source of electric potential DC and the slugged coil 9 and also has a normally open pair of contacts connected in series with the source DC and an indicating device, such as a lamp, in an indicating unit IU. Microswitch 20 has a normally open pair of contacts connected in series with a source of electric potential EP and another indicating device in a unit IU2. In addition, microswitch 20 has a pair of normally closed contacts connected in series between the source EP and a motor or the like in the device 2 for withdrawing tape from the loop 30 at a substantially constant rate.

In the rest condition of the apparatus, i.e. when the utilisation device has no requirement for tape, the apparatus is in the condition illustrated in the drawing. In this condition the size of the loop 30 is a maximum, and the sensing lever 18 actuates microswitch 23 by engagement with the operating member 22. Operation of microswitch 23 causes the slugged coil 9 to be de-energised, whereby the tape 3 is gripped by the jaws 8 and 13 under the combined influences of the springs 11 and 14.

When the utilisation device 2, which may be a data reading or recording device, for example, draws tape from the loop 30, the loop size decreases. Decrease of the loop size causes the lever 18 to pivot in a clockwise direction about axis of its spindle against the influence of the tension spring 21. This pivoting action continues until the microswitch 23 is released and closes the supply circuit for the coil 9 of the electro-magnetic brake. At the same time the microswitch 23 opens the circuit of the indicating unit IU, which, until this time, has indicated a "tape stationary" condition. Energisation of the slugged coil 9 causes the armature 10 to move into the coil against the influence of the compression spring 11. The member 7 falls with the armature 10 so that the jaw 8 releases the tape 3 and is held by compression spring 14 against stop 7a.

The loop previously formed around roller 4 now being slack, and the tape being released from the grip of the jaws 8 and 13, lever 18 is pivoted anticlockwise by the spring 21 and its roller 17 draws tape into the loop 30, drawing on that portion of the tape previously looped over roller 4. Pivoting of the lever 18 in the anticlockwise direction continues until the lever actuates microswitch 23 again, causing the circuit to unit IU to be reenergized and cutting off the current supply to the coil 9 of the electromagnetic brake. De-energisation of the coil 9 permits the armature 10 to move upwards under the influence of the compression spring 11, whereupon the right hand end of the jaw 8, as viewed in the drawing, grips the tape between it and the fixed jaw 13. Continued upward movement of the armature presses the roller 4 against the tape to draw a minor loop of tape from the store 1 while the jaws 8 and 13 close fully from right to left so that the tape between roller 5 and the right hand one of the jaws remain tight. As soon as the right hand end of jaws 8 grips the tape, the supply of tape to loop 30 is arrested.

As long as the tape 3 is withdrawn from the loop 30 by the utilisation device at a substantially constant rate, the intermittent supply of tape to the loop is continued and thus movement of the tape in the loop is indicated by the alternate energisation and de-energisation of the unit IU. This unit is one which emits a warning signal if, and only if, its input signals depart from a given range of repetition frequency. If, for any reason, the utilisation device ceases to draw tape from loop 30, then loop 30 will fill. In consequence, the lever will come to rest in the position shown in the drawing and the alternating signals to the unit IU will cease.

In the event of obstruction to the supply of tape from the store 1, tape will be drawn from the loop 30 until the size of the loop has decreased to the extent that lever 18 is drawn into engagement with the operating member 19 of the microswitch 20 and actuates the switch. Operation of the switch 20 causes the lamp in the second indicating unit "IU2" to light up and also opens the circuit of device 2 supplying the motor or the like which withdraws tape from the loop 30.

The apparatus of the invention is especially suitable for inclusion in data processing equipment or teleprinters and is suitable for employment with tape on which data is recorded as code combinations of perforations or with tape for magnetic recording. By means of the invention "fail safe" provision may be made against failure in the supply of tape, with corresponding alarms indicative of "tight tape" or "no tape," while an alternating signal of frequency corresponding to the speed of working of the utilisation device provides a monitoring indication during normal working.

It is to be understood that the foregoing description of specific examples of this invention is made by way of example only and is not to be considered as a limitation on its scope.

What I claim is:

1. Apparatus for supplying tape at an alternating rate to a loop of tape as it is withdrawn from the loop by a utilisation device at a substantially uniform rate, the apparatus comprising:
   an electro-magnetic brake operative to control the tape supply to the loop;
   said electro-magnetic brake including a pair of jaws between which the tape is constrained to pass, one of which jaws is stationary and the other one of which is carried by and movable with an armature which, in the de-energized condition of an associated coil, causes the tape to be gripped and arrested by both jaws and which, in the energized condition of the associated coil, causes the tape to be released from the jaws;
   a member carried by said armature is provided to withdraw a predetermined amount of tape from a source of supply thereof when the tape is gripped and its supply to said loop is arrested;
   a plurality of loop-forming rollers on which the tape is arranged and one of which rollers is operative, through engagement of the tape therewith, to cause a sensing member to move in one or the other of two directions dependent respectively on an increase or decrease in the amount of tape in the loop; and
   electric switching means operative by the sensing member in alternating movements thereof in the one and the other direction to apply and inhibit application of an energizing current to the electro-magnetic brake which thereupon alternately arrests and releases the tape.

2. Apparatus as claimed in claim 1, in which the electric switching means is operative by the sensing member to effect indication of movement of tape in the loop, and operative thereby to effect indication of cessation of withdrawal of tape from the loop.

3. Apparatus as claimed in claim 1, in which second electric switching means is provided and is operative by the sensing member, to effect indication of cessation of supply of tape to the loop.

4. Apparatus as claimed in claim 1, in which the tape is data bearing medium.

5. Apparatus as claimed in claim 4, in which said data is recorded in the tape as code combinations of perforations.

6. Apparatus as claimed in claim 4, in which said data is magnetically recorded in the tape.

References Cited

UNITED STATES PATENTS

| | | | |
|---|---|---|---|
| 1,135,416 | 4/1915 | Walkup | 226—39 X |
| 1,968,818 | 8/1934 | Dirkes et al. | 226—39 X |
| 2,280,943 | 4/1942 | Ferm | 226—39 |
| 2,737,387 | 3/1956 | Harris et al. | 226—33 |
| 2,744,491 | 5/1956 | Vergobbi | 226—44 X |

ALLEN N. KNOWLES, *Primary Examiner.*